United States Patent [19]

Lebby et al.

[11] Patent Number: 5,345,527
[45] Date of Patent: Sep. 6, 1994

[54] INTELLIGENT OPTO-BUS WITH DISPLAY

[75] Inventors: Michael S. Lebby, Apache Junction; Karen E. Jachimowicz, Goodyear, both of Ariz.

[73] Assignee: Motorola, Inc., Schaumburg, Ill.

[21] Appl. No.: 115,835

[22] Filed: Sep. 3, 1993

[51] Int. Cl.⁵ .............................................. G02B 6/44
[52] U.S. Cl. ..................... 385/114; 385/89; 385/8; 385/901; 345/904
[58] Field of Search ............... 385/114, 89, 59, 71, 385/8, 20, 51, 65, 91, 120, 115, 901; 345/904

[56] References Cited

U.S. PATENT DOCUMENTS

4,730,198 3/1988 Brown et al. ................... 385/91
5,228,101 7/1993 Lebby et al. ................... 385/91

Primary Examiner—Rodney B. Bovernick
Assistant Examiner—Phan Thi Heartney
Attorney, Agent, or Firm—Eugene A. Parsons

[57] ABSTRACT

An intelligent opto-bus including an optical/electrical connector with a display. An array of photonic components is mounted on a base and coupled to external electrical connections of the base. Electronics are mounted on the base and coupled to the array for sensing the operation of the array and the status of optical signals supplied to optical ports of the array. A display is coupled to the electronics to provide a visual indication of the operation of the array and the status of optical signals supplied to the optical ports of the array. The base is molded with a well and grooves. The electronics and display are positioned in the well and the grooves form optical waveguides that communicate with a fiber ribbon.

16 Claims, 5 Drawing Sheets

INTELLIGENT OPTO-BUS WITH DISPLAY

The present invention relates, in general, to optical connectors for information buses, and more particularly, to a novel method of displaying the status of a bus and information passing through the bus.

BACKGROUND OF THE INVENTION

Generally, optical connectors are utilized to couple information that has been transduced from electrical signals to optical signals in a transmitter, and from optical signals to electrical signals in a receiver. Therefore, they can be useful in connecting many different types of complex electronic based systems or environments. Typically, there is a source or transmitter to send and a receiver to collect the signals. Optical connectors are useful for isolating electrical interference from ground planes. For example, optical connectors are not effected by skin effects and switching noise. Also, signal integrity and clock skew are improved with optical connectors. In addition, optical connectors provide access to wide operational bandwidths that allow increased information transfer. Optical connectors are important in connecting many optical fibers spatially positioned in linear arrays, hereafter referred to as opto-links.

In complex electronic based systems, specifically, information opto-links that require more than one computer processor to communicate with other computer processors, it is important that the connectors are correctly connected so that the opto-links are transferring the desired information. However, one drawback with such complex electronic based systems is that an incorrectly mated connector could render the whole system inoperable, or worse unreliable. Down-time in such systems is a costly penalty that must be reduced and furthermore, maintenance of such complex systems is expensive.

Complex electronic based systems that have utilized optical connectors in the past have also suffered from an inadequacy of controlling and manipulating information between the transmitter and the receiver. Information lost during a communication between the transmitter and the receiver can again render the complex electronic based system inoperable, inaccurate and unreliable. Valuable time lost during a faulty transmission of information is expensive and reduces efficiency in complex electronic computations.

Additionally, complex electronic based systems also suffer from an unknown real-time or present status of information transferred between the transmitter to the receiver; however, without a knowledge of the present status of the optical connector, fault diagnosis is required which wastes valuable time and reduces operational efficiency.

It is a purpose of the present invention to provide a new and improved intelligent opto-bus including a first optical/electrical connector with a display.

It is another purpose of the present invention to provide a new and improved intelligent opto-bus including a first optical/electrical connector with a display for providing a constant indication of the status of the opto-bus.

It is still another purpose of the present invention to provide a new and improved intelligent opto-bus including a first optical/electrical connector with a display which substantially improves efficiency of the opto-bus and maintenance of a system utilizing the opto-bus.

It is a further purpose of the present invention to provide a new and improved intelligent opto-bus including a first optical/electrical connector with a display which is easy to fabricate.

It is a still further purpose of the present invention to provide a new and improved intelligent opto-bus including a first optical/electrical connector with a display which is highly versatile and can be quickly and easily modified and/or updated.

SUMMARY OF THE INVENTION

The above problems and others are substantially reduced or eliminated and the above purposes and others are realized in an intelligent opto-bus including a first optical/electrical connector with a display. The connector includes a base having external electrical connections and an array of photonic components, each having an optical port, mounted on the base. The array has electrical terminals associated therewith and coupled to the external electrical connections of the base. Electronics are mounted on the base and coupled to the electrical terminals of the array of photonics components and to the external electrical connections of the base. The electronics include circuitry for sensing the operation of the array of photonics components and the status of optical signals supplied to the optical ports of the array of photonic components. A display is coupled to the electronics, the display provides a visual indication of the operation of the array of photonics components and the status of optical signals supplied to the optical ports of the array of photonic components.

Further, an optical/electrical connector with a display is preferably included at each end of the opto-bus. Also, the optical/electrical connectors can be fabricated in a variety of different embodiments for a variety of different applications and/or systems.

BRIEF DESCRIPTION OF THE DRAWINGS

Referring to the drawings.

DESCRIPTION OF THE PREFERRED EMBODIMENTS

Figure 1:
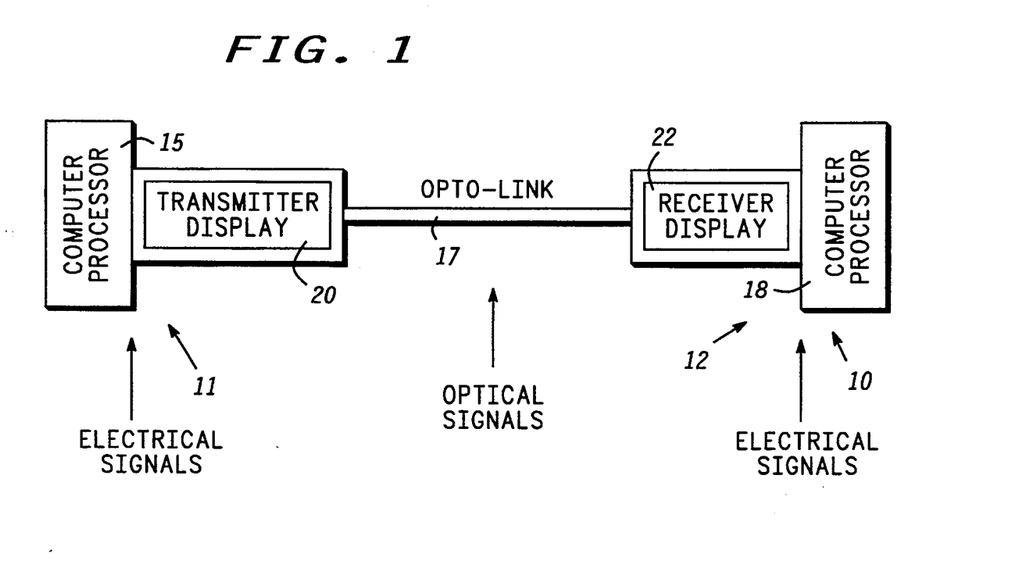
FIG. 1 is a simplified block diagram of an opto-bus, with optical electrical connectors at each end, incorporating the present invention.

A simplified block diagram of an opto-bus 10, incorporating the present invention, with optical/electrical connectors 11 and 12 at opposite ends thereof, is illustrated in FIG. 1. In this specific example, electrical apparatus 15 provides electrical signals to optical/electrical connector 11. Apparatus 15 can be, for example, a computer processor which in turn can be a component of a larger network or system. Further, apparatus 15 can generate the electrical signals directly and/or it can receive the electrical signals from associated equipment.

Optical/electrical connector 11 is a transmitter, in this specific example, which converts the received electrical signals to optical signals that are transmitted by way of an opto-link 17 to optical/electrical connector 12. While opto-link 17 could be fiber ribbon, optical waveguide, free light rays, etc., in the disclosed embodiments a fiber ribbon containing a plurality of optical fibers will be used for ease of explanation. Optical/electrical connector 12 is, in this specific embodiment, a receiver which converts the optical signals received from opto-link 17 into electrical signals and supplies them to electrical apparatus 18. As in the explanation of apparatus 15, electrical apparatus 18 can use the electrical signals directly or transmit them on to associated equipment. Also, while optical/electrical connector 11 is illustrated as a transmitter and optical/electrical connector 12 is illustrated as a receiver, it should be understood that any desired combination of the functions can be incorporated in both of the connectors.

Optical/electrical connectors 11 and 12 include displays 20 and 22, respectively, which are connected to electronics within the connectors and provide a continuous indication of the operation of opto-bus 10. Displays 20 and 22 are alpha-numeric displays utilizing a matrix of any of the well known light generating devices, e.g. liquid crystal devices (LCDs), light emitting diodes (LEDs), field emission devices (FEDs), lasers, etc. Further, as will be explained in more detail presently, the electronics in optical/electrical connectors 11 and 12 are designed to not only monitor the operation of the connectors but to monitor the condition of the signal being received and/or transmitted so that maintenance people can simply look at the display to determine which of the fibers in opto-link 17 are operating and whether the signals passing through the connector contain errors. In addition, the electronics can include circuits for determining the strength (e.g., amplitude) of signals so that the display can provide an indication of imminent failure of components. Also, in some specific applications the display can provide specifications for opto-bus 10 so that maintenance people know what each connector should be doing. The various pieces of information can be cycled through the display in any convenient predetermined cycle, all of which is programmed into the electronics.

Figure 2:
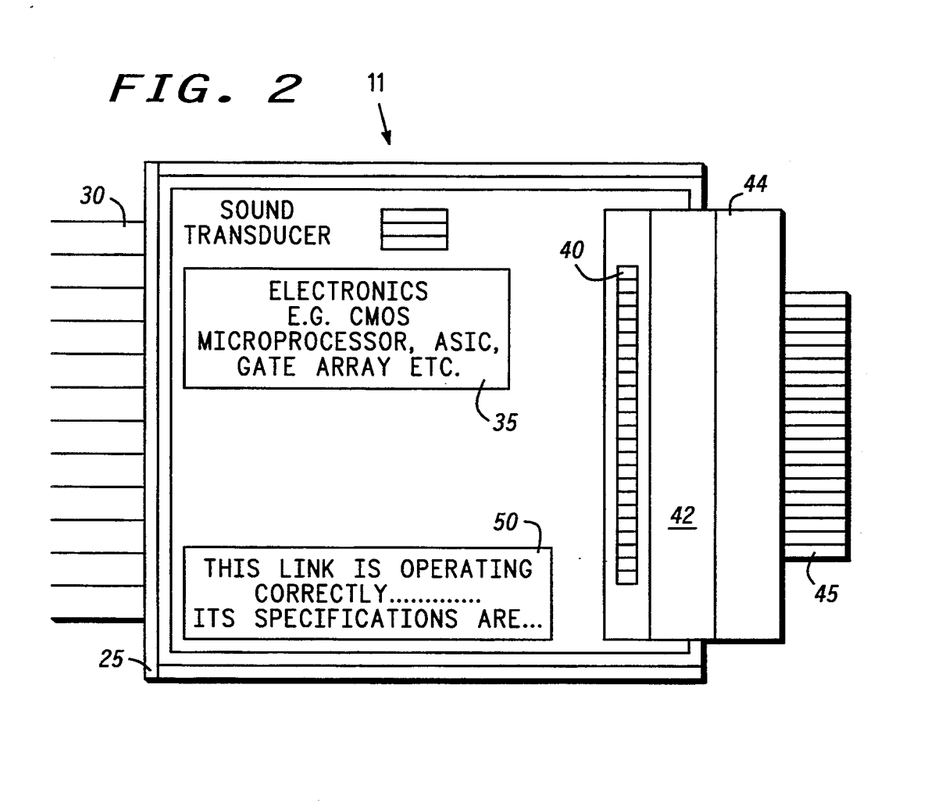
FIG. 2 is a greatly enlarged and simplified block diagram of one of the optical/electrical connectors of FIG. 1.

Referring specifically to FIG. 2, a greatly enlarged and simplified view of optical/electrical connector 11 is illustrated. Optical/electrical connector 11 includes a base 25 with a plurality of external electrical connections 30. Electronics 35 is mounted on base 25 and includes one or more semiconductor chips (e.g., a microprocessor, ASIC chips, a gate array, etc.), which chips are mounted separately, or included in a hybrid circuit or on a printed circuit board. In any case, electronics 35 is coupled to electrical connections 30 for power and processing of electrical signals.

An array 40 of opto-electric transducers is mounted on base 25 and electrically connected to electrical connections 30 and electronics 35. As mentioned above, array 40 includes any predetermined combination of electrical-to-optical (light generating) and/or optical-to-electrical (light detecting) transducers required for the specific application. Array 40 is fixedly attached to a light coupler 42 which is in turn designed to matingly receive one end 44 of a fiber ribbon 45. Coupler 42 and end 44 provide a means for quickly and easily disconnecting optical/electrical connector 11 from fiber ribbon 45 for maintenance, modifications, upgrades, or simply moving of the equipment.

An alpha-numeric display 50 is mounted on base 25 and electrically and operatively connected to electronics 35. As a typical example, electronics 35 includes a microprocessor that receives and analyzes all electrical signals on electrical connections 30 and supplied to, or received from, array 40. In this embodiment, the analysis is performed by sensing the amplitude of signals provided by the receivers (optical-to-electrical photonic devices) and sensing the format of messages passing through optical/electrical connector 11. It should be understood that special test messages can, in addition to or instead of the above described tests, be transmitted periodically, which test messages are specifically designed to operate each photonic device in array 40 and any circuits in electronics 35 that may be subject to failure. The microprocessor then formats messages, or simply retrieves stored messages from memory, which messages are designed to advise maintenance people of the status of electrical signals on electrical connections 30, optical/electrical connector 11, and/or signals on fiber ribbon 45. A typical message that might be utilized is illustrated on display 50 in FIG. 2, which message is "THIS LINK IS OPERATING CORRECTLY." In the illustrated message some specifications of the link are also cycled onto display 50 for the benefit of maintenance people.

Figure 3:
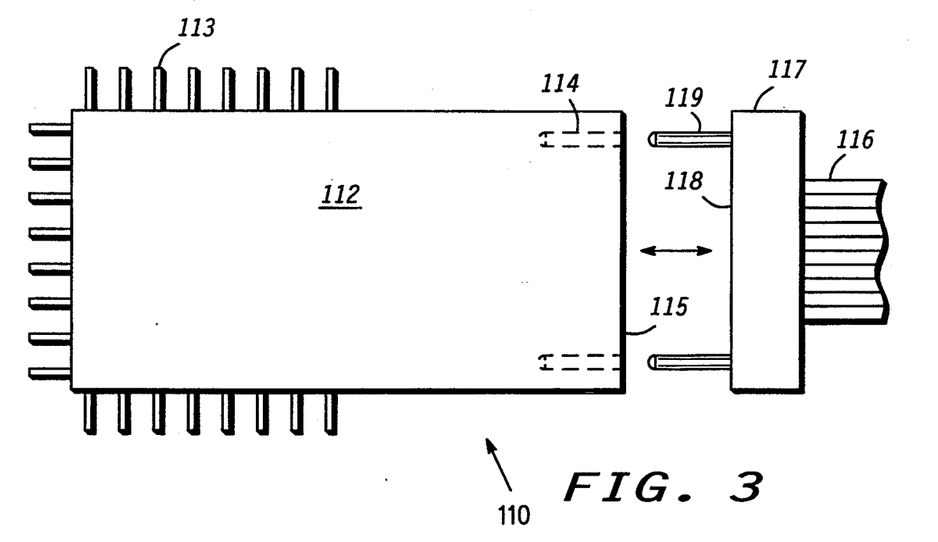
FIG. 3 is a view in top plan of an optical/electrical connector embodying the present invention.

Referring specifically to FIG. 3, a view in top plan of an optical/electrical connector 110 embodying the present invention is illustrated. Connector 110 includes a base 112 with a plurality of external leads 113 extending outwardly from three edges thereof. Alignment guides, which in this specific embodiment are holes 114, are formed in a fourth edge 115 of base 112. As will be explained presently, in a preferred embodiment base 112 is molded, with leads 113 and holes 114 positioned and/or formed therein during the molding process. Further, one end of a plurality, or bundle, of optical fibers 116, such as a fiber ribbon, is molded into a package 117 so that one end of each of the plurality of optical fibers 116 is exposed in a surface 118 of package 117. Alignment guides, such as ferrules 119, are also molded into package 117 so as to extend outwardly from surface 118. When ferrules 119 are matingly engaged in holes 114, surface 118 is in abutting engagement with edge 115.

Figure 4:
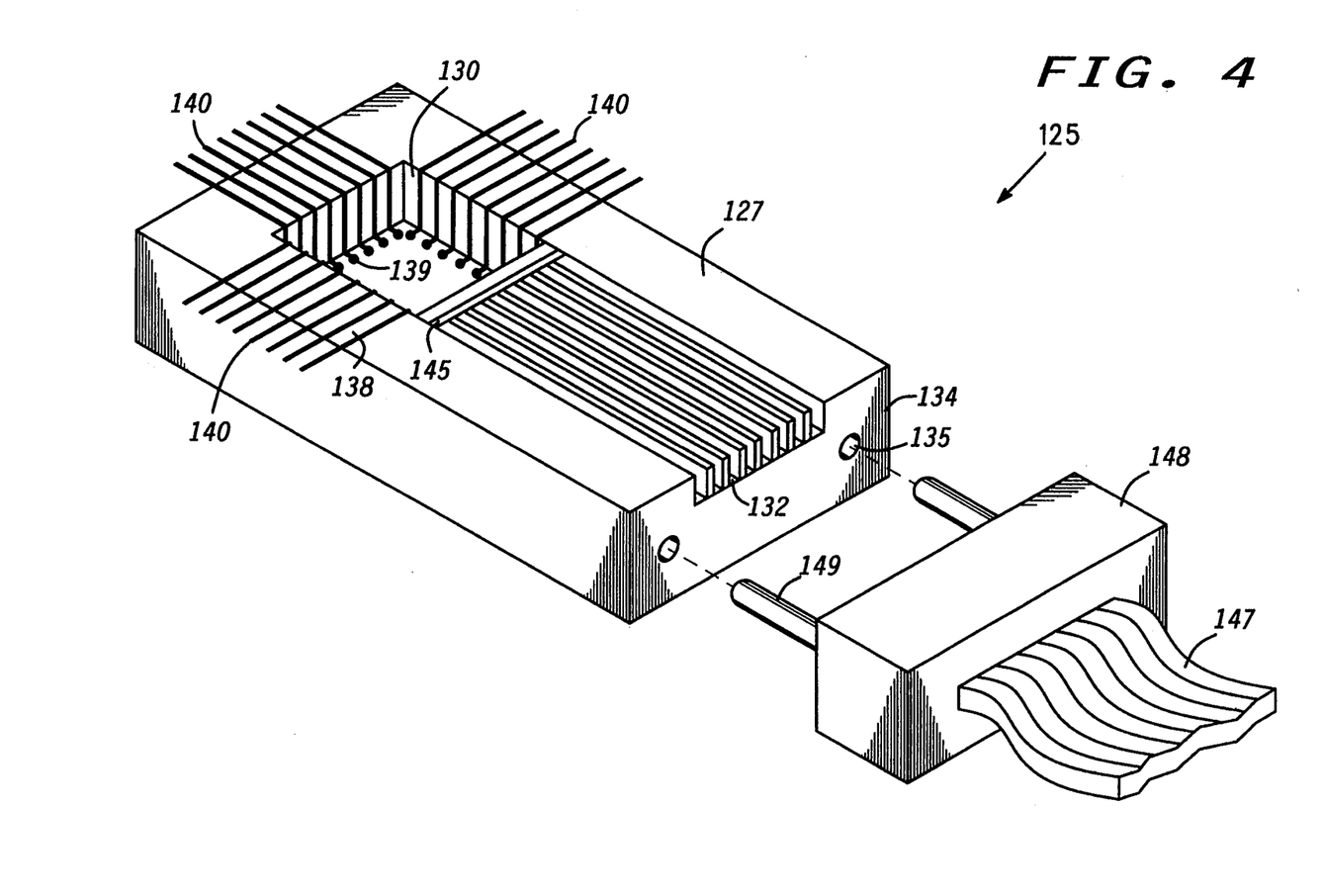
FIG. 4 is a perspective view of an optical/electrical connector similar to the connector of FIG. 3, in an intermediate step of fabrication.

Referring to FIG. 4, an optical/electrical connector 125, similar to connector 110, of FIG. 3 is illustrated in a perspective view. Connector 125 is illustrated in an intermediate step of the fabrication process. A generally rectangularly shaped base 127, which has been formed by molding, includes a well 130 and a plurality of grooves 132 formed in one major surface. Grooves 132 extend from one side of well 130 to a first outer edge 134 of base 127 and are generally rectangular in cross-section. Also, alignment guides, which in this specific embodiment are holes 135 are formed in edge 134 of base 127. External electrical connections, in this embodiment a preformed leadframe 138, having first ends, or terminals, 139 exposed and positioned in well 130 and second ends 140 extending outwardly beyond the other three outer edges of base 127 is included in base 127 at the time of molding. It will of course be understood that in some special applications it may be convenient to mold base 127 with well 130 and grooves 132 and then simply insert preformed leadframe 138 into well 130 after the molding is completed.

An array 145 of photonic components, each having an optical port, is positioned in well 130 with the optical ports each aligned with a separate one of the plurality of grooves 132. Array 145 further has electrical terminals associated therewith and directly coupled to leadframe 138. In most instances, leadframe 138 and array 145 are designed so that the electrical terminals associated with array 145 are in contact with appropriate exposed portions of leadframe 138 when the array is properly positioned in well 130. It will of course be understood that the photonics components of array 145 could be connected to leadframe 138 by any of the well known means, such as wire bonding, bump bonding, etc. As will be understood by those skilled in the art, the photonics components of array 145 may include lasers, vertical cavity surface emitting lasers, light emitting diodes, photo detectors, photosensitive diodes, etc. or any combination thereof.

A plurality of optical fibers 147 are also illustrated in FIG. 4 with one of the ends thereof molded into a package 148, as explained above in conjunction with FIG. 3. Alignment guides, ferrules 149, are also included for engagement with holes 135. With ferrules 149 engaged in holes 135 so that the surface of package 148 abuts edge 134, the exposed ends of optical fibers 147 are aligned, one each, with grooves 132 in base 127. Further, as already explained, photonics components of array 145 have an optical port, one each, aligned with individual grooves 132 at the other end thereof.

Figure 5:
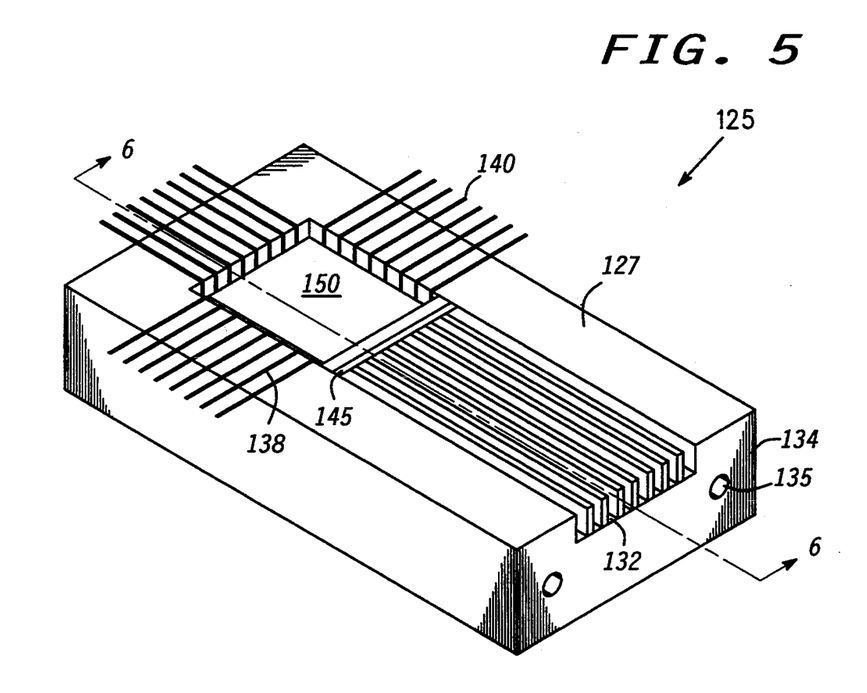
FIG. 5 is a perspective view similar to the view of FIG. 4, in another intermediate step of fabrication.

A perspective view of optical/electrical connector 125 is illustrated in FIG. 5, in another intermediate step of the fabrication process. In this step an IC chip 150 is illustrated in position in well 130. Here it will be understood that IC chip 150 could in fact be a small printed circuit board or hybrid circuit having one to several IC chips mounted thereon and it is intended to cover all such modifications in the term IC chip. Terminals 139 (see FIG. 4) are positioned so that the various bonding pads of IC chip 150 each engage an appropriate terminal 139 when IC chip 150 is positioned in well 130. Permanent connections are made by, for example, placing a solder bump on each terminal 139 to be connected, placing IC chip 150 into well 130 and applying conductive heat, infra red heat, etc to melt the solder bump and form a permanent connection. With IC chip 150 and array 145 properly connected to leadframe 138, grooves 132 are filled with a curable plastic material having an appropriate index of refraction (when cured) to form optical waveguides.

Figure 6:
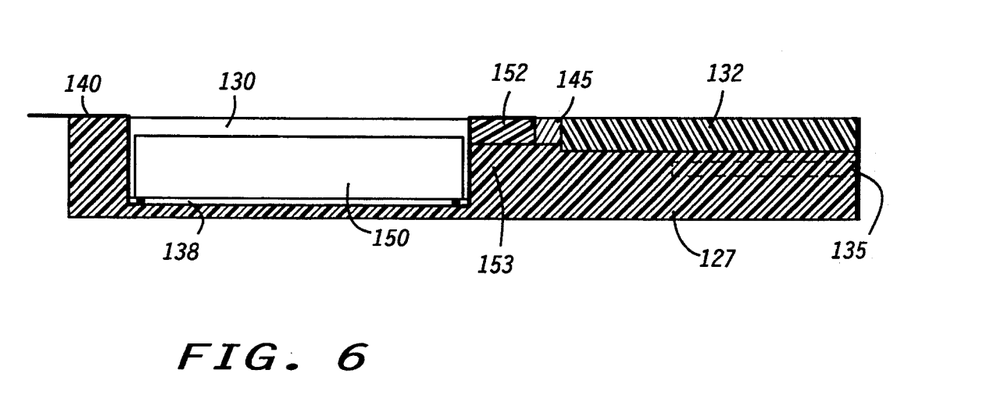
FIG. 6 is a sectional view as seen from the line 6—6 of FIG. 5.

As illustrated in FIG. 6, array 145 is mounted on a header 152, which is in turn supported on an alignment step 153 in well 130 so that the optical ports of photonic components in array 145 are aligned with grooves (now optical waveguides) 132. It should be understood that well 130 and the area surrounding array 145 can also be filled with the curable plastic that is used to fill grooves 132, if desired. Also, as explained in the above cited copending patent application, a second generally rectangular base portion or cover (not shown) can be formed and positioned over the upper surface of base 127 to form an upper protective surface for well 130 and grooves 132.

By way of example only, base 127 and the cover are made by injecting a transparent epoxy molding compound, available under the Tradename HYSOL MG18 from Dexter Corporation, into molds. The temperature of the molds ranges between 150° C. to 175° C. with a preferred temperature range from 160 degrees Celsius to 165 degrees Celsius. Molding pressure of the molds ranges between 500 psi to 1,000 psi with a preferred pressure range from 750 pounds per square inch to 800 pounds per square inch. Typically, transfer time ranges from 30 to 50 seconds at a temperature of 150° C. to 20 to 30 seconds at a temperature of 175° C. Curing time typically ranges from 3 to 5 minutes at 150° C. to 2 to 4 minutes at a temperature of 175° C. Upon completion of the curing time, base 127 and the cover are removed from the molds. Typically, a post-curing step is necessary in order to achieve maximum physical and electrical properties of the HYSOL material. This step generally proceeds at 150 degrees Celsius for approximately 2 to 4 hours. Completion of the post-cure step results in base 127 and the cover having a refractive index of approximately 1.52.

Once the molding and curing processes, as well as the removal of base 127 and the cover from their respective molds have been completed, base 127 and the cover are ready to be assembled. Assembly is achieved by applying an optically clear adhesive with a refractive index at least 0.01 higher than base 127 and the cover to grooves 132 and the upper surface of base 127. At this point, well 130 can also be filled. In a preferred embodiment of the present invention, these requirements are fulfilled by applying an optically clear epoxy available under a Tradename EPO-TEK 301-2 from EPOXY TECHNOLOGY INC. Typically, after the adhesive is applied to grooves 132 and the upper surface of base 127, the cover is compressed against the upper surface of base 127, thereby squeezing and filling grooves 132 and adhering both base 127 and the cover together. Curing times for the adhesive epoxy is dependent upon temperature, e.g., at room temperature curing time is 2 days and at 80 degrees Celsius curing time is 1.5 hours.

A more complete explanation of this procedure and the materials utilized is disclosed in a copending U.S. patent application entitled "Molded Waveguide and Method For Making Same", with Ser. No. pending 07/889,335, filed 28 May 1992, assigned to the same assignee and incorporated herein by reference.

Figure 7:
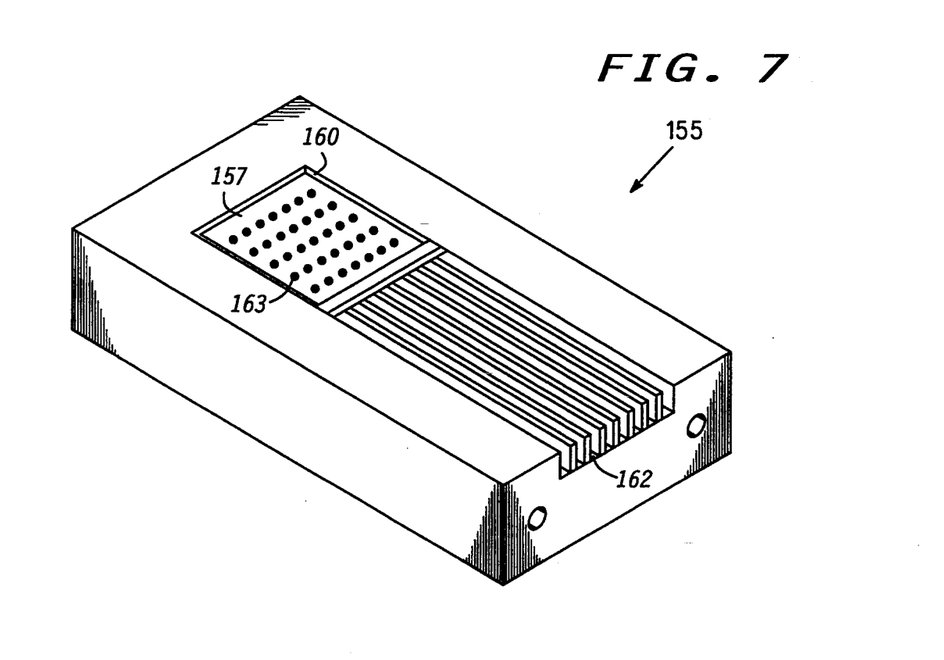
FIG. 7 is a perspective view of another embodiment of an optical/electrical connector embodying the present invention.

In a somewhat different arrangement, IC chip 130 can be placed in well 130 (in an inverted position) with solder bumps or the like on appropriate bonding pads and preformed leadframe 138 can then be placed in well 130 and attached to IC chip 150 by usual methods. In the latter arrangement leadframe 138 can even be attached to IC chip 150 before they are placed in well 130. Further, in some special applications array 145 can be connected directly to IC chip 150, or the photonic components can even be formed directly on IC chip 150. An optical/electrical connector 155, illustrated in FIG. 7, is another different arrangement wherein an IC chip 157 is inverted and positioned in a well 160 with bump bonds 163 formed on the rear surface thereof. In this embodiment, a photonic component array can be mounted directly on IC chip 157 before placing it in well 160. The optical ports of the array are automatically aligned with a plurality of grooves 162 when IC chip 157 is positioned in well 160. IC chip 157 is then molded into well 160 at the same time that grooves 162 are filled with curable plastic and cured.

Figure 8:
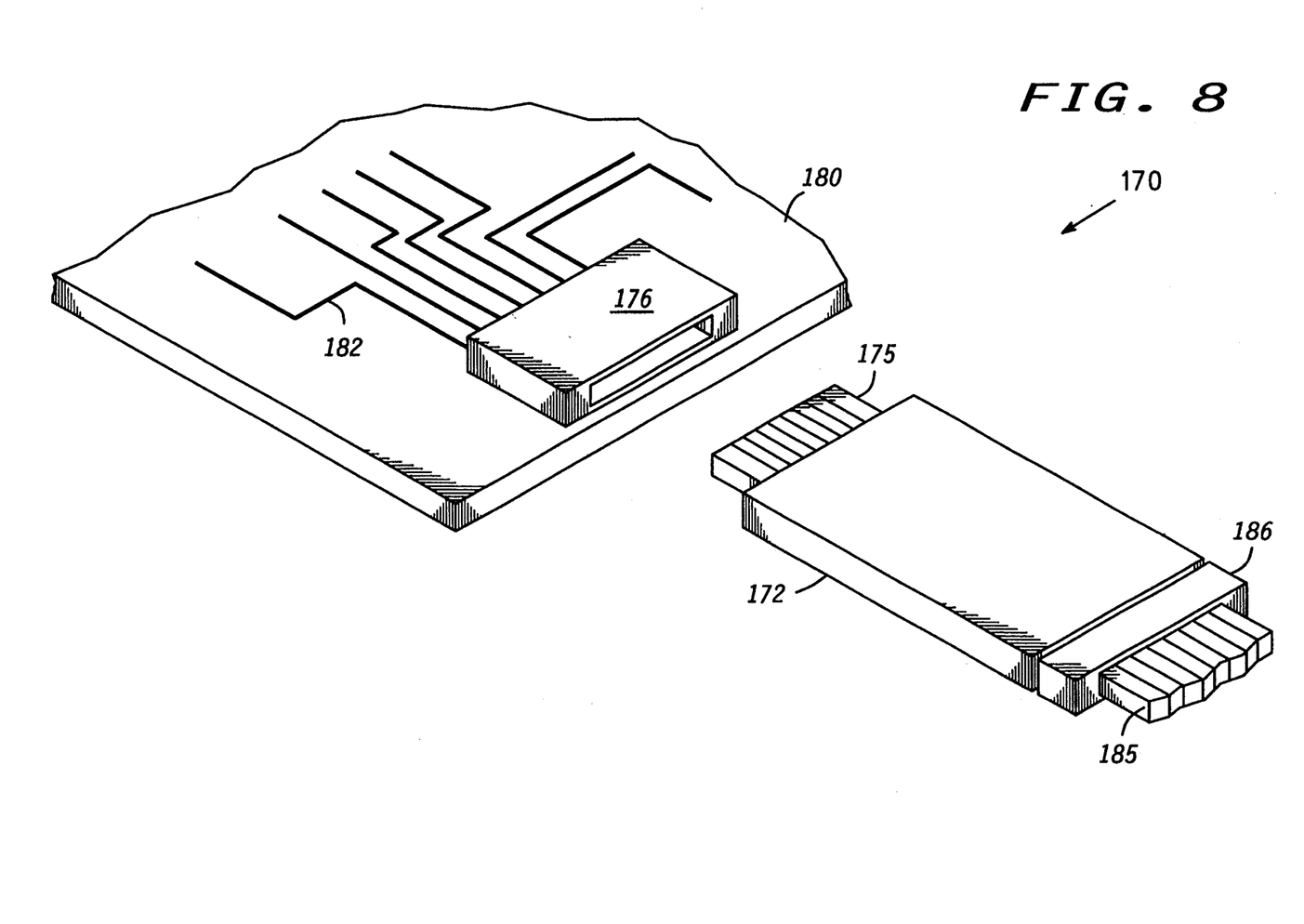
FIG. 8 is a perspective view of another embodiment of an optical/electrical connector embodying the present invention.

Another version of an optical/electrical connector, designated 170, is illustrated in FIG. 8. In this embodiment, a base 172 is molded with the well, grooves and alignment guides as explained above. Connector 170 further has external electrical connections molded therein including one of a male or female portion of an electrical plug, in the present case male portion 175. A mating female portion 176 is fixedly mounted on a printed circuit board 180 with electrical leads 182 extending through printed circuit board 180 to remotely located components, not shown. Portions 175 and 176 of the electrical plug are, preferably, any of the zero insertion force connectors presently available on the market. Base 172 and the components contained therein are completely enclosed (explained above) so as to form a unique and very convenient optical/electrical connector. One end of each of a plurality of optical fibers 185 are molded into a package 185 (explained above) and alignment guides are also molded into the package so that it mates with base 172, as illustrated to couple optical fibers 185 directly to electrical leads 182.

Accordingly, a new and improved intelligent opto-bus including at least one optical/electrical connector with a display is disclosed. The optical/electrical connector with a display is specifically designed to provide a constant indication of the status of the opto-bus and, therefore, substantially improves efficiency of the opto-bus and maintenance of a system utilizing the opto-bus. Further, the optical/electrical connector with a display is easy to fabricate, is highly versatile and can be quickly and easily modified and/or updated.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. An intelligent opto-bus including a first optical/electrical connector with a display comprising:
   a base having external electrical connections;
   an array of photonic components, each having an optical port, mounted on the base, the array further having electrical terminals associated therewith and coupled to the external electrical connections of the base;
   electronics mounted on the base and coupled to the electrical terminals of the array of photonics components and to the external electrical connections of the base, the electronics including circuitry for sensing the operation of the array of photonics components and the status of optical signals supplied to the optical ports of the array of photonic components; and
   a display coupled to the electronics, the display providing a visual indication of the operation of the array of photonics components and the status of optical signals supplied to the optical ports of the array of photonic components.

2. An intelligent opto-bus including a first optical/electrical connector with a display as claimed in claim 1 wherein the electronics includes a microprocessor programmed to sense predetermined input signals.

3. An intelligent opto-bus including a first optical/electrical connector with a display comprising:
   a base having a plurality of grooves extending to a first outer edge of the base;
   the base further having external electrical connections extending outwardly beyond the base;
   an array of photonic components, each having an optical port, mounted on the base with the optical ports each aligned with a separate groove, the array further having electrical terminals associated therewith and coupled to the external electrical connections of the base;
   the plurality of grooves in the base being filled with a plastic material to form optical waveguides from the optical ports of the array to the first outer edge of the base;
   electronics mounted on the base and coupled to the electrical terminals of the array of photonics components and to the external electrical connections of the base, the electronics including circuitry for sensing the operation of the array of photonics components and the status of optical signals supplied to the optical ports of the array of photonic components; and
   a display coupled to the electronics, the display providing a visual indication of the operation of the array of photonics components and the status of optical signals supplied to the optical ports of the array of photonic components.

4. An intelligent opto-bus including a first optical/electrical connector with a display as claimed in claim 3 including in addition a plurality of optical fibers each having a first end, molded into a package with a side formed to removably mate with the first outer edge of the base so as to axially align the plurality of optical fibers, one each, with the plurality of grooves in the base.

5. An intelligent opto-bus including a first optical/electrical connector with a display as claimed in claim 4 wherein the plurality of optical fibers each further have a second end, molded into a package with a side formed to removably mate with a first outer edge of a base of a second optical/electrical connector with a display so as to axially align the plurality of optical fibers, one each, with a plurality of grooves in the base.

6. An intelligent opto-bus including a first optical/electrical connector with a display comprising:
   a base having a plurality of grooves formed therein and extending to a first outer edge, the base further having alignment guides associated with the grooves at the first outer edge, and the base further having external electrical connections;
   an array of photonic components, each having an optical port, mounted on the base with the optical ports each aligned with a separate groove, the array further having electrical terminals associated therewith and coupled to the exposed first ends of the external electrical connections of the base; and
   the plurality of grooves in the base being filled with a plastic material to form optical waveguides from the optical ports of the array to the first outer edge of the base;
   a semiconductor chip including electronics coupled to the electrical terminals of the array of photonics components and to the external electrical connections of the base, the electronics including circuitry for sensing the operation of the array of photonics components and the status of optical signals supplied to the optical ports of the array of photonic components; and a display positioned mounted on the base and coupled to the electronics of the semiconductor chip, the display providing a visual indication of the operation of the array of photonics components and the status of optical signals supplied to the optical ports of the array of photonic components.

7. An intelligent opto-bus including a first optical/electrical connector with a display as claimed in claim 6 wherein the external electrical connections include one of a male and a female portion of an electrical plug molded in the base.

8. An intelligent opto-bus including a first optical/electrical connector with a display as claimed in claim 6 wherein the external electrical connections include externally situated bump bonds.

9. An intelligent opto-bus including a first optical/electrical connector with a display as claimed in claim 6 wherein the external electrical connections include a leadframe molded in the base.

10. An intelligent opto-bus including a first optical/electrical connector with a display as claimed in claim 6 wherein the electronics includes one of a microprocessor, DSP, ASIC, gate array.

11. An intelligent opto-bus including a first optical/electrical connector with a display comprising:

a base having a well and a plurality of grooves extending from the well to a first outer edge of the base, the base further having alignment guides associated with the grooves at the first outer edge, and the base further having external electrical connections with first ends exposed and positioned in the well and second ends extending outwardly beyond a second outer edge of the base;

an array of photonic components, each having an optical port, positioned in the well of the base with the optical ports each aligned with a separate groove, the array further having electrical terminals associated therewith and coupled to the exposed first ends of the external electrical connections of the base;

the plurality of grooves in the base being filled with a plastic material to form optical waveguides from the optical ports of the array to the first outer edge of the base;

a plurality of optical fibers each having a first end, molded into a package with a side formed to removably mate with the first outer edge of the base, and the package further including alignment guides designed to mate with the alignment guides associated with the grooves at the first outer edge so as to axially align the plurality of optical fibers, one each, with the plurality of grooves in the base;

a semiconductor chip positioned in the well and including electronics coupled to the electrical terminals of the array of photonics components and to the external electrical connections of the base, the electronics including circuitry for sensing the operation of the array of photonics components and the status of optical signals supplied to the optical ports of the array of photonic components; and a display positioned in the well and coupled to the electronics of the semiconductor chip, the display providing a visual indication of the operation of the array of photonics components and the status of optical signals supplied to the optical ports of the array of photonic components.

12. An intelligent opto-bus including a first optical/electrical connector with a display as claimed in claim 11 wherein the external electrical connections include one of a male and a female portion of an electrical plug molded in the base.

13. An intelligent opto-bus including a first optical/electrical connector with a display as claimed in claim 11 wherein the external electrical connections include externally situated bump bonds.

14. An intelligent opto-bus including a first optical/electrical connector with a display as claimed in claim 11 wherein the external electrical connections include a leadframe molded in the base.

15. An intelligent opto-bus including a first optical/electrical connector with a display as claimed in claim 11 and the intelligent opto-bus further including a second optical/electrical connector with a display.

16. An intelligent opto-bus including a first optical/electrical connector with a display as claimed in claim 15 wherein the plurality of optical fibers each further have a second end, molded into a package with a side formed to removably mate with a first outer edge of a base of the second optical/electrical connector with a display so as to axially align the plurality of optical fibers, one each, with a plurality of grooves in the base of the second optical/electrical connector with a display.

* * * * *